United States Patent

[11] 3,626,169

[72] Inventor Louis R. Rudolph
 Annandale, Va.
[21] Appl. No. 8,796
[22] Filed Feb. 5, 1970
[45] Patented Dec. 7, 1971
[73] Assignee The United States of America as represented by the Secretary of the Navy

[54] TRIGONOMETRIC ANGLE COMPUTER
 4 Claims, 3 Drawing Figs.

[52] U.S. Cl.................................................. 235/186,
 307/235, 318/652, 328/146, 328/148, 340/347 SY
[51] Int. Cl...................................................... G06g 7/22
[50] Field of Search.......................................... 235/186;
 307/231, 232, 235; 328/146–148; 340/347 SY;
 318/603, 652

[56] References Cited
 UNITED STATES PATENTS

| | | | |
|---|---|---|---|
| 3,048,337 | 8/1962 | Byerly | 235/186 |
| 3,303,493 | 2/1967 | Charbonnier | 340/347 AD |
| 2,858,438 | 10/1958 | Merrill | 307/235 X |
| 3,054,910 | 9/1962 | Bothwell | 307/235 |
| 3,479,496 | 11/1969 | Buesch et al. | 328/146 X |

Primary Examiner—Malcolm A. Morrison
Assistant Examiner—R. Stephen Dildine, Jr.
Attorneys—R. S. Sciascia, Arthur L. Branning and James G. Murray

ABSTRACT: Apparatus to calculate an angle $\theta$ of a value $A \cos \theta$, where A is known. Compare a generated signal $A \cos \omega t$ with $A \cos \theta$ in a differential amplifier such that when $A \cos \omega t > A \cos \theta$ there is an output pulse on an electronic time counter, the length of the pulse being directly proportional to the angle $\theta$.

INVENTOR
LOUIS R. RUDOLPH

BY
ATTORNEY

TRIGONOMETRIC ANGLE COMPUTER

The invention described herein may be manufactured and used by or for the Government of the United States of America for governmental purposes without the payment of any royalties thereon or therefor.

BACKGROUND OF THE INVENTION

This invention relates to a system for computing the angle of a sine or cosine function. Occasions arise when an angle forming part of a trigonometric equation requires quick determination. For example, the commonly utilized equations $x = A \sin \theta$ and $x = A \cos \theta$ where $x$ and $A$ are known require calculation of the angle $\theta$. While $x$ and $A$ are known they do not remain constant for a long period of time and the angle $\theta$, which is also varying, must be precisely and immediately known. Utilization of a slide rule and a trigonometric table is both cumbersome, slow and inaccurate. A digital computer must be updated with new information and is very costly.

Previous analog trigonometric calculators for calculating angles such as $$\theta = \text{arc sine } x/A$$
$$\theta = \text{arc cosine } x/A$$

were electromechanical and had the disadvantage of being too bulky, heavy and required a large power source.

SUMMARY OF THE INVENTION

A technique for computing the arc sine or arc cosine is described. The method is useful when a function $x = A \cos \theta$ is given with $A$ and $x$ known and $\theta$ to be determined. In general, the angle $\theta$ is found by generating a cosine function and then making a time measurement on this waveform which is determined by the amplitude $x$. A basic waveform $x = A \cos \omega t$, is generated and when $\cos \omega t_1 = x/A$, a time $t$, has elapsed which defines $\omega t_1$. If $\omega$ is known and $t_1$ measured, the angle $\theta$ is then found, since $$\cos \theta = x/A = \cos \omega t_1$$
$$\theta = \omega t_1$$

A differential amplifier that compares the two waveforms, $A \cos \theta$ and $A \cos \omega t$ triggers a switch which output is displayed on a counter, and $t_1$, or $\theta$, may thus be determined. The generated waveform may also be rectified to calculate arc sine angles.

OBJECTS OF THE INVENTION

It is therefore an object of the invention to provide for an accurate system for calculation of trigonometric functions.

Another object of the present invention is to provide for a device to perform both arc sine and arc cosine operations.

A still further object of this invention is to provide an analog trigonometric function calculator.

Yet another object of the present invention is to provide a direct display of a calculated angle.

A still further object of this invention is to provide for a continuous display of a calculated angle.

Other characteristics and advantages of the invention will appear more clearly in the following description when taken in conjunction with the attached drawings in which:

THEORY OF OPERATION

Let it be assumed that for a certain period of time $A \sin \theta$ has a value. Referring to FIG. 1a, $A \sin \omega t$ is generated and then rectified as indicated by the dotted lines. $A \sin \omega t$ rotates from $t = 0$ to $t = t_1$, at which time $t_1$, $A \sin \omega t_1 = x$. Since $A \sin \theta = x$ and $A \sin \omega t_1 = x$, then $\theta = \omega t_1$. Further, it can be observed that the time period $-t_2$ also equals time $t_1$. Thus, the time period $t_3$ is equal to twice $t_1$ and it can be stated that $\omega t_3 = 2 \omega t_1 = 2\theta$. The angle $\theta$ is uniquely determined by the period $t_3$ $$\theta = \omega t_3 / 2$$

$\omega$ being a known quantity and $t_3$ a measured quantity.

Figure 1:
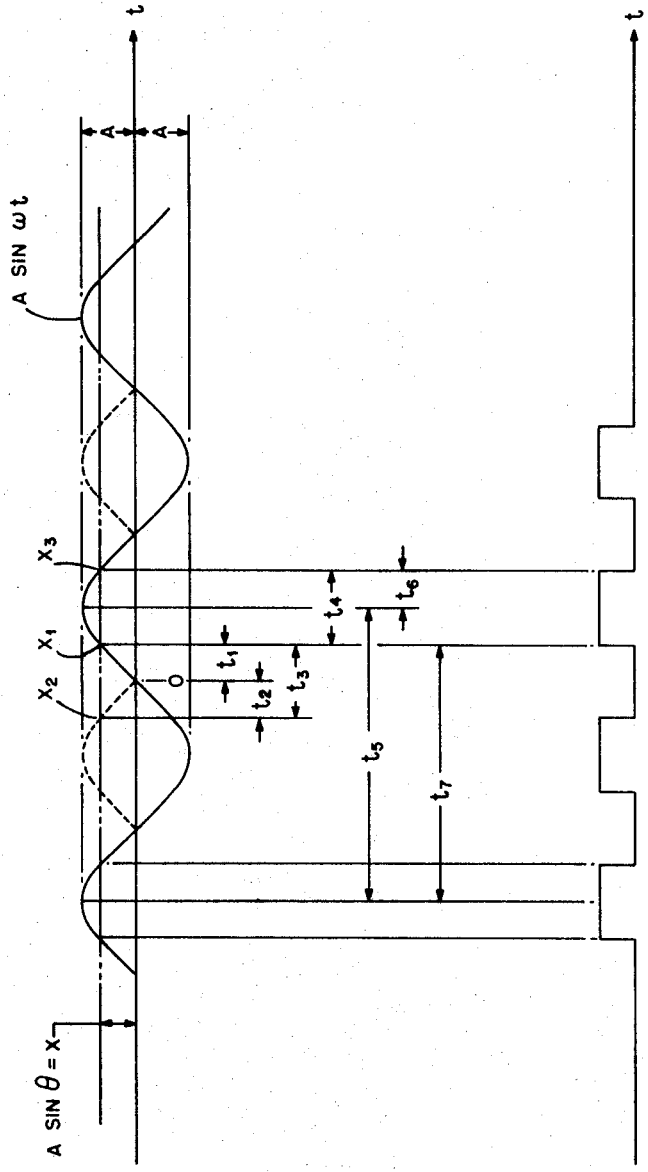
FIG. 1a is a time plot of an unknown and a reference waveform.
FIG. 1b is a diagram of the waveform of the resultant output signal.

The measurement of the time period $t_3$ is more easily accomplished than the measurement of the period $t_1$ of FIG. 1. It is for this reason that the electronic design of the Trigonometric Angle Computer is based on the scheme of measuring $t_3$ as above.

The time period $t_4$ has a relationship to $x = A \cos \theta$ similar to that of the period $t_3$ to the sine function. The derivation follows the same logic.

MATHEMATICAL DERIVATION

For arc sine determination
Referring to FIG. 1,
$x = A \sin \omega t$ (from 0 to $\pi$ radians)
$t_1 = 1/\omega \text{ arc sin } x_1/A$
$-t_2 = 1/\omega \text{ arc sin } x_2/A$
$t_3 = t_1 + (-t_2) = t_1 - t_2$
$t_3 = 1/\omega \text{ arc sin } x_1/A + 1/\omega \text{ arc sin } x_2/A$
$x_1 = x_2$ (if $A \sin \theta$ constant for a period of $A \sin \omega t$)
$t_3 = 2/\omega \text{ arc sin } x_1/A$
Let $x_1 = x_2 = A \sin \theta$
$t_3 = 2/\omega \text{ arc sin } (A \sin \theta / A)$
$t_3 = 2/\omega \, \theta$
Since $\omega = 2\pi f$
$t_3 = 2\theta / 2\pi f = \theta / \pi f$ (in radians)
$t_3 = \theta / \pi f (2\pi/360)$ (in degrees)
$t_3 = \theta / 180 f$
By proper choice of the frequency $f$, e.g., $f = 5555$ Hz.
$t_3$ (in $\mu$sec.) $= \theta$ (in degrees)
For arc cosine determination
$x = A \cos \omega t$
$t_6 = 1/\omega \text{ arc cos } x_3/A = t/2\pi \text{ arc cos } x_3/A$
As $\omega = 2\pi f = 2\pi / t$
$t_6 = t/2\pi \text{ arc cos } x_3/A$
$t_7 = t_5 - t_6$
$t_7 = t_5 - t/2\pi \text{ arc cos } x_3/A$
As $t_5$ is the period $t$
$t_7 = t - t/2\pi \text{ arc cos } x_3/A$
$t_4 = t_5 + t_6 - t_7$
$t_4 = t + t/2\pi \text{ arc cos } x_3/A - t + t/2\pi \text{ arc cos } x_3/A$
which simplifies to
$t_4 = t/\pi \text{ arc cos } x_3/A$
Since $A \cos \theta = x_3$
$t_4 = t/\pi \text{ arc cos } A \cos \theta / A$
$t_4 = t \theta / \pi$ in radians
$t_4 = t \theta / \pi (2\pi / 360)$ in degrees
$t_4 = t \theta / 180$
Let $t / 180 = 1$
Then $t = 180 \mu \text{sec.}$ (frequency = 5555 Hz. $t_3$ (in $\mu$ sec.) = $\theta$ (in degrees)

DESCRIPTION OF THE PREFERRED EMBODIMENT

Figure 2:
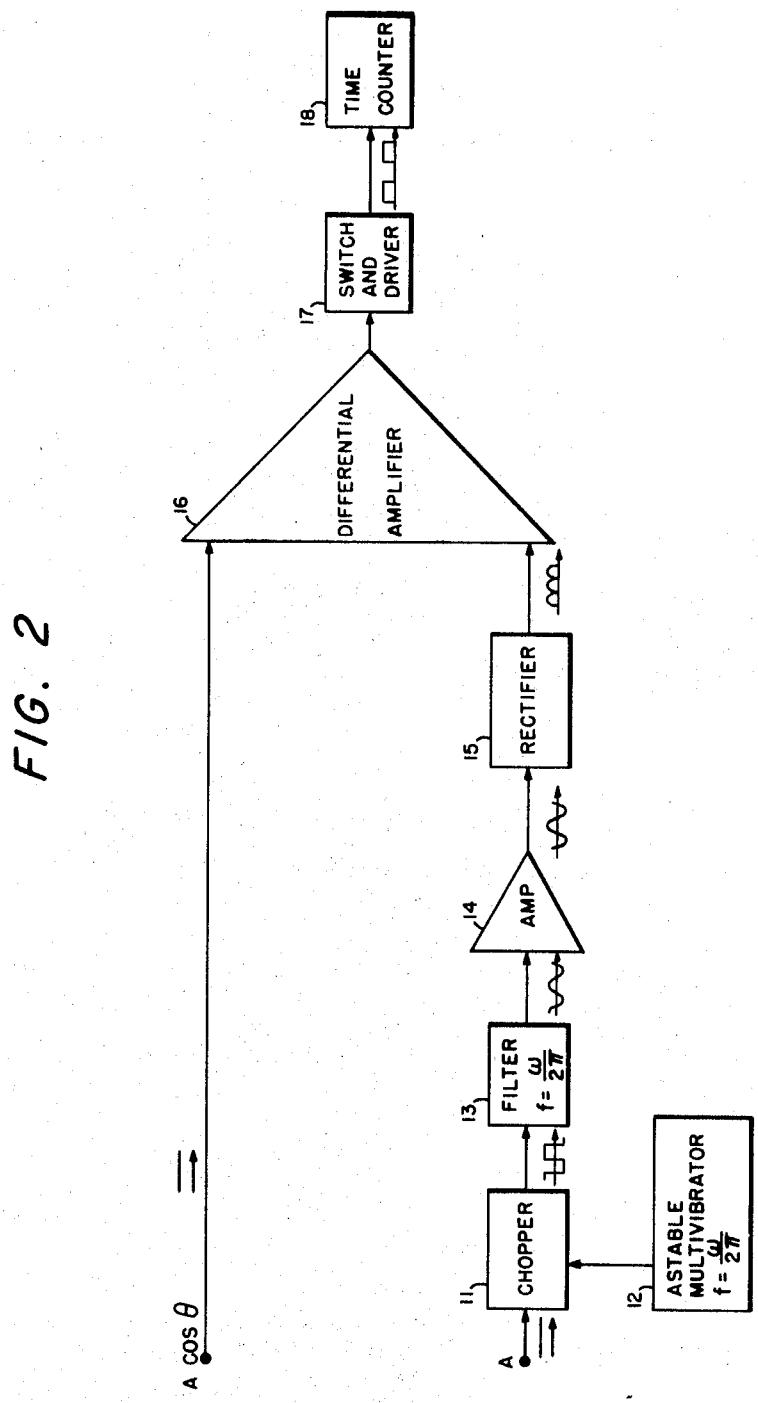
FIG. 2 is a block diagram of a circuit for the calculation of an unknown angle.

The operation of the angle computer is best explained by tracing the signal paths of the block diagram of FIG. 2. A known DC voltage A is fed to a chopper stage 11 which converts the voltage A into a square wave having a peak to peak amplitude of A. The frequency of the square wave is determined by astable multivibrator 12. The multivibrator 12, for reasons to be evident further on, has a temperature compensated frequency of 5555 Hz. The square wave chopper output is fed to a 5555 Hz. filter 13 which filters out the DC component and the harmonic frequencies. The output of the filter, having a 1 kHz. band-pass at 5555 Hz. is essentially sinusoidal. The gain of amplifier 14 following the filter 13 is adjustable to provide the correct amount of gain to compensate for the attenuation due to the filter 13 and thus provide an output of $A \sin 2\pi \, 5555 \, t$. This is a sinusoidal waveform of amplitude A at a frequency 5555 Hz. The sinusoidal waveform is then rectified by rectifier 15 and is fed to comparator or differential amplifier 16. The other input to differential amplifier 16 is $A \sin \theta$ which is constant for at least a period of $A \sin 2\pi\, 5555\, t$. The output of differential amplifier 16 is the difference between $A \sin \theta$ and $A \sin 2\pi\, 5555\, t$. The quiescent point of the differential amplifier 16 represents $A \sin \theta = A \sin 2\pi\, 5555\, t$. The differential amplifier 16 is capacitively coupled to a switch 17 which is off when $A \sin \theta$ is greater than $A \sin 2\pi\, 5555\, t$. When $A \sin \theta$ is less than $A \sin 2\pi\, 5555\, t$, the switch 17 passes a positive pulse having a duration equal to the period that $A \sin \theta$ is less than $A \sin 2\pi\, 5555\, t$. The frequency 5555 Hz. was specifically chosen to cause the pulse width, when measured in microseconds, to equal the angle numerically. By using a time interval unit of an electronic counter 18 such as a HP 5245L/5262 A, it is possible to read the angle $\theta$ directly in degrees on the counter readout. As explained in the analysis above, the positive pulse represents arc cos $x/A$, and the duration (FIG. 1b) without the pulse represents arc sin $x/A$ and it is therefore very simple to read either arc sine or arc cosine off the time interval counter 18 merely by reversing the trigger slope controls. The trigonometric angle can also be read on a DC averaging-type meter, the average DC level proportional to the positive pulse width calibrated to read $1\mu$ amp per degree of angle.

It should be obvious to those skilled in the art that the apparatus described is capable of determining arc cosine functions without utilizing rectifier 15. The astable multivibrator 12 frequency need not be 5555 Hz. and may be of any constant value that can assist in quickly determining the angle $\theta$ from the pulse width as displayed on the counter 18.

While I have illustrated and described the best form of preferred embodiments of my invention, it will be apparent to those skilled in the art that changes may be made in the form of the apparatus without departing from the spirit of the invention as set forth in the appended claims.

1. Apparatus for calculating an unknown angle $\theta$ comprising:
   a first signal source having the waveform $A \sin \theta$;
   a second signal source having the waveform $A \sin \omega t$, wherein $\omega t$ is known;
   a comparator having input terminals to which said first signal source and said second signal source are directly connected and an output terminal;
   means connected to said output terminal for providing a pulse waveform, the duration of each pulse in said waveform being proportional to said unknown angle $\theta$;
   means connected to said providing means for measuring said pulse duration and displaying said duration whereby said unknown angle $\theta$ may be determined; and
   wherein said second signal source includes:
   a known DC source A;
   a chopper connected to said DC source for producing a square wave output having an amplitude A;
   an astable multivibrator connected to said chopper for controlling its chopping rate at a frequency $\omega/2\pi$;
   means connected to the output of said chopper for providing a sinusoidal output whereby its output of $A \sin \omega t$ is fed to said comparator as said second signal source.

2. Apparatus as recited in claim 3 wherein:
   said pulse providing means is a switch which emits a pulse whenever $A \sin \omega t$ is greater than $A \sin \theta$; and wherein said measuring means is an electronic time interval counter.

3. Apparatus as recited in claim 2, including:
   amplifying means and rectifying means between said sinusoidal providing means and said comparator; and wherein said sinusoidal providing means is a filter having a band-pass filter of 1 kHz. at said frequency $\omega/2\pi$.

4. Apparatus as recited in claim 3, wherein said multivibrator frequency is 5555 Hz. whereby said unknown angle may be directly read off said electronic time interval counter.

* * * * *